United States Patent [19]

Turner et al.

[11] 4,292,420

[45] Sep. 29, 1981

[54] EMULSION POLYMERIZATION PROCESS FOR PRODUCING VINYL DISPERSION RESINS

[75] Inventors: James W. Turner, Bay Village; Bela K. Mikofalvy, Avon Lake, both of Ohio

[73] Assignee: The B. F. Goodrich Company, Akron, Ohio

[21] Appl. No.: 105,693

[22] Filed: Dec. 20, 1979

[51] Int. Cl.$^3$ .............................................. C08F 14/06
[52] U.S. Cl. .............................. 526/212; 260/31.4 R; 260/31.8 R; 428/402; 526/74; 526/213; 526/215; 526/225; 526/330; 526/344.2; 528/485; 528/487; 528/488; 528/492

[58] Field of Search ................. 526/74, 212, 213, 215, 526/225, 330, 344.2; 528/485, 487, 488, 492; 428/402

[56] References Cited

U.S. PATENT DOCUMENTS 4,076,920  2/1978  Mikofalvy et al. .................. 526/74

Primary Examiner—Harry Wong, Jr.
Attorney, Agent, or Firm—Roy P. Wymbs

[57] ABSTRACT

A method for drying a polymer latex comprising mixing with said latex a partially fugitive gas producing electrolyte and filtering said latex to recover the polymer.

16 Claims, No Drawings

EMULSION POLYMERIZATION PROCESS FOR PRODUCING VINYL DISPERSION RESINS

CROSS REFERENCE TO RELATED APPLICATION

A related application for U.S. Pat. is Ser. No. 105,694, filed Dec. 20, 1979, in the names of Bela K. Mikofalvy and James W. Turner, which is a continuation-in-part of Ser. No. 84,489, filed Oct. 15, 1979, now abandoned, which is a continuation of Ser. No. 955,817, filed Oct. 30, 1978, now abandoned.

BACKGROUND OF THE INVENTION

It is well known that vinyl resins may be plasticized or changed from the hard, horny and stiff state to a soft, plastic workable condition by the addition thereto of certain plasticizers, such as dioctyl phthalate, and the like. These vinyl polymers or resins are referred to as dispersion resins or paste resins and are usually made employing an aqueous emulsion polymerization technique.

When the vinyl dispersion resin is mixed or blended with a plasticizer(s), it is referred to as a "plastisol". By virtue of the flowability of the plastisol, it can be processed into various useful products. For example, the plastisols can be used in making molded products, films, coatings, and the like. Accordingly, the vinyl dispersion resin must be capable of being mixed with the plasticizers easily and uniformly to form low viscosity plastisols which are stable, containing particles of uniform and proper size, and, at elevated temperatures, capable of producing films, and like products, of good clarity.

With the customary emulsion polymerization processes, suitable lattices have been difficult to obtain since the latices usually contain particles of varying size and are either too fine or too large. Various proposals have heretofore been made to overcome these difficulties but not with the ultimate success desired. For example, the use of various different emulsifiers and catalysts have been proposed. Also, varying the conditions of polymerization has been suggested. However, in most of these cases, too much coagulation occurred with the resulting latex containing too much coagulum or partially agglomerated particles which precipitate reducing the yield. Further, the shelf life of such latices leaves much to be desired. It is desirable to have latices which change very little during storage with respect to viscosity and have and maintain good heat stability.

In U.S. Pat. No. 4,076,920, issued Feb. 28, 1978, a process for preparing vinyl dispersion resins is disclosed and claimed which produces polymers having unique properties for certain end uses. However, here as in other prior art processes, it is necessary to spray dry the latex or polymer emulsion resulting in aggregates of the polymer particles which requires grinding to break them up into a size capable of being used in plastisols. Without subsequent grinding of the spray dried resin, or passing the plastisol through colloidal mills, the plastisol is not suitable for many important applications, such as thin film coatings, due to the hard agglomerates that do not fall apart in the plastisol.

As opposed to "pearl" or suspension polymerization, where the polymer particles are large enough to be filtered, vinyl dispersion resins cannot be recovered from the water emulsions by filtration and tray drying because they go through the filters and also because the small particles pack tightly together during tray drying forming "cake" that even after grinding remains hard to formulate into smooth plastisols making it practically useless for most commercial operations. The particles of polymer to be used in a plastisol should preferably be spherical in shape to present as small a particle surface as possible for minimum solvation. Also, a dispersion of spheres provides the lowest flow viscosity for charging molds, coating and like operations (see U.S. Pat. 3,179,646, issued Apr. 20, 1965).

It is therefore desirable to have a process wherein the aqueous polymer emulsion or latex can be dried by means other than spray drying, to produce friable aggregates of individual spheres of polymer particles which can be separated into individual spherical polymer particles by simple light rubbing or crushing.

SUMMARY OF THE INVENTION

We have found that after producing a vinyl resin latex, by the emulsion polymerization technique, the addition thereto, with thorough mixing, of an aqueous solution of an electrolyte, such as, for example, ammonium carbonate, said latex can be as is or after partial removal of the water by filtration or centrifuging, and the like, to produce friable aggregates of individual spheres of polymer particles which can be separated into individual spherical polymer particles by simple light rubbing or crushing and usually just by the simple mixing of the resin with plasticizer during the plastisol preparation. Thus the spray drying and the subsequent grinding steps are eliminated producing a superior product for plastisols.

DETAILED DESCRIPTION

In the present invention "vinyl dispersion resin" or "vinyl resin" refers to polymers and copolymers of vinyl and vinylidene halides, such as vinyl chloride, vinylidene chloride, and the like. The vinyl halides and vinylidene halides may be copolymerized with one or more other monoethylenically unsaturated monomers copolymerized therewith. As examples of such copolymerizable monomers, there may be mentioned the $\alpha,\beta$-olefinically unsaturated carboxylic acids, such as acrylic acid, methacrylic acid, $\alpha$-cyanoacrylic acid, and the like; esters of acrylic acid, such as methyl acrylate, ethyl acrylate, butyl acrylate, octyl acrylate, cyanoethyl acrylate, and the like; esters of methacrylic acid, such as methyl methacrylate, butyl methacrylate, and the like; nitriles, such as acrylonitrile and methacrylonitrile; acrylamides, such as methylacrylamide, N-methylol acrylamide, N-butoxyl methacrylamide, and the like; vinyl ethers, such as ethyl vinyl ether, chloroethyl vinyl ether, and the like; the vinyl ketones; styrene and styrene derivatives including $\alpha$-methyl styrene, vinyl toluene, chlorostyrene, and the like; vinyl naphthalene, allyl and vinyl chloroacetate, vinyl acetate vinyl pyridine, methyl vinyl ketone, and other mono-olefinic unsaturated monomers of the types known to those skilled in the art. The present invention is particularly applicable to the manufacture of vinyl dispersion resins or pastes made by the polymerization of vinyl chloride or vinylidene chloride alone or in admixture with one or more mono-olefinic unsaturated monomers copolymerizable therewith in amounts as great as about 80% by weight, based on the weight of the monomer mixture. The most preferred vinyl dispersion resin is polyvinyl chloride (PVC) and the invention, for simplicity and convenience, will be described in connection therewith, it being understood that this is merely intended in an illustrative and not a limitative sense.

The important aspect of the instant invention is that after the formation of the vinyl polymer latex, or aqueous vinyl polymer emulsion, the same can be dried into friable aggregates of individual spheres of polymer particles by simple drying such as, for example, tray drying, rotary dryers, air jet mill drying, fluid bed dryer, continuous belt drying, pressure drying, and the like, other than by spray drying and grinding. After the vinyl polymer latex has been formed and prior to drying thereof, there is added to the latex, with thorough mixing or agitation, an aqueous solution of an electrolyte or a mixture of electrolytes which enables one to use a simple drying method in recovering the polymer or resin. Part of the water in the latex may be removed by filtering or centrifuging, depending on the type of emulsifier or emulsifier system that is employed in making the latex and also the type of electrolyte(s) that is added to the latex. As pointed out above, the addition of the electrolytes to the latex eliminates the troublesome spray drying and grinding which very often results in undesirable polymer quality.

The electrolytes suitable for use in the present invention are various salts. When more than one electrolyte is employed, at least one should be partially fugitive to produce gas during the drying step, such as the carbonates. As examples of the various electrolytes there may be named ammonium carbonate; calcium chloride; calcium carbonate; the carbonates, bicarbonates, phosphates, citrates and oxalates of sodium, ammonium, potassium, zinc, cadmium, calcium, barium and the like. The amount of electrolyte suitable for use in the present invention will vary from about 0.05% to about 5.0% by weight based on the weight of the vinyl polymer in the latex. Preferably, an amount in the range of about 0.1% to about 3.0% by weight is employed.

The friable aggregates resulting from the process of the instant invention represent a distinct advantage or improvement over prior known means for recovering vinyl dispersion or paste resins from the aqueous medium for use in plastisols, for example, spray drying and subsequent grinding. The friable aggregates are easily formed and the individual spherical particles of the vinyl dispersion resins, of a size required for paste resins, are easily formed by crushing, simple grinding or rubbing of said aggregates. Usually, the individual spherical particles of polymer will have a size or diameter in the range of about 0.1 micron to about 10.0 microns. For most of the commercial uses of plastisols today, it is preferred to have polymer particles in the range of about 0.2 micron to about 2.0 microns.

When making vinyl dispersion resins by the emulsion polymerization procedure it is necessary to employ a proper emulsifier or emulsifier system. For example, various fatty acid salts may be employed, such as sodium, ammonium, potassium, and the like, as well as the sulfate and sulfonate type soaps from $C_{12}$ to $C_{20}$ alkyl or aryl hydrocarbons, or various combinations thereof. The saturated fatty acids which are useful may be either natural or synthetic and should contain from 8 to 20 carbon atoms. As examples of such acids, there may be named lauric, myristic, palmitic, marganic, stearic, and the like, beef tallow, coconut oil and the like. The useful sulfate or sulfonate type soaps are those having the general formula:

$$CH_3(C_2H_{2n})\text{-}X$$

wherein n is an integer from 7 to 17, and X is selected from $$-CH=CH-CH_2-Y;$$

$$-\overset{R}{\underset{|}{C}}H-CH_2-\overset{R'}{\underset{|}{C}}H-Y;$$

or $$SO_2-M$$

wherein R is H, OH or an alkyl group having from 1 to 4 carbon atoms; R' is H, or an alkyl group having from 1 to 4 carbon atoms; Y is $-SO_3-M$; $-O-SO_3-M$; or $-OCH_2CH_2O-_mSO_3-M$, wherein M is selected from $NH_4$, Na and K, and m is an integer from 7 to 17. As examples of the soaps having the above formula there may be named sodium dodecyl benzene sulfonate, sodium alkyl sulfonates, sodium hydroxy sulfonates, sodium alkenyl sulfonates, as well as the ammonium and potassium salts, and the like. The emulsifier is employed in an amount in the range of about 0.5% to about 4.0% by weight, based on the weight of the monomer or monomers being polymerized. One can also use mixtures of emulsifiers.

When the ammonium salts of the fatty acids are used, they can be made by mixing the fatty acid and ammonium hydroxide, separating the salt and then adding the same to the polymerization medium or polymerization premix in the usual fashion. However, it is preferred to form the ammonium salt in situ, that is, by adding the fatty acid and ammonium hydroxide separately to the polymerization mixture or medium wherein they react to form the salt. An excess of ammonium hydroxide, over that necessay to react with the fatty acid should be employed in order to maintain the reaction medium on the alkaline side, when this is desirable.

In the present invention, it is often desirable and one can optionally employ, at least one long straight chain saturated alcohol in combination with the emulsifier(s), said alcohol being one containing from 14 to 24 carbon atoms. Examples of such alcohols are tetradecanol, pentadecanol, hexadecanol, heptadecanol, octadecanol, nonadecanol, eicosanol, heneicosanol, tricosanol, and tetracosanol. Mixtures of the alcohols can also be employed and in many cases an alcohol mixture is preferred, such as, for example, a mixture of a 14 carbon alcohol and an 18 carbon alcohol. Also, lower carbon content alcohols can be employed when mixed with the longer chain alcohols, such as a mixture of dodecanol and octadecanol. When employing an alcohol, the ratio of alcohol to the emulsifier(s) of 1.0 can be used. However, the best results are obtained when said ratio is greater than 1.0.

Depending upon the emulsifier used in the polymerization recipe, the pH of the reaction mixture will vary over a wide range. While it is preferred to operate on the alkaline side, the reaction medium will be on the acid side when a sulfate and/or a sulfonate type soap is employed. For example, when using sodium lauryl sulfate as the emulsifier, the pH will be approximately 3.5. Usually the emulsion polymerization process is conducted at a pH in the range of about 3.0 to about 12.0. However, it is preferred to operate in a pH range of about 8.0 to about 10.5. If the pH is too high, it takes too much NH$_4$OH and if the pH is too low, the polymer buildup in the reactor increases and the coagulum increases. The amount of $NH_4OH$ needed to properly adjust the pH will depend in part on the particular emulsifier system being used in the reaction mixture. Of course, other alkaline agents may be employed to adjust the pH of the reaction mixture, such as NaOH, KOH, etc. The choice of a particular alkaline agent depends upon the ingredients in the reaction medium.

When producing vinyl dispersion resins by the emulsion polymerization process, the same is conducted in the presence of a compound or compounds capable of initiating the polymerization reaction. Free radical yielding initiators, normally used for polymerizing olefinically unsaturated monomers, are satisfactory. The useful initiators or catalysts include for example, the various preoxygen compounds, such as lauryl peroxide, isopropyl peroxydicarbonate, benzoyl peroxide, t-butyl hydroperoxide, t-butyl peroxypivalate, cumene hydroperoxide, t-butyl diperphthalate, pelargonyl peroxide, 1-hydroxycyclohexyl hydroperoxide, and the like, azo compounds such as azodisobutyronitrile, dimethylazodiisobutyrate, and the like. Also, useful initiators are the water-soluble peroxygen compounds, such as hydrogen peroxide, persulfates, such as potassium persulfate, ammonium persulfate, and the like. The amount of initiator used will generally be in the range of from about 0.01% to about 0.5% per weight, based on the weight of the monomer or monomers being polymerized, and preferably from about 0.02% to about 0.1% by weight.

The initiator may be charged completely at the outset of the polymerization or it may be added incrementally to the reactor during the course of the polymerization reaction. However, it is preferred to charge the initiator at the onset by adding it to the monomer premix with the other ingredients of the reaction mixture. This is advantageous when said premix is homogenized prior to introduction into the reactor. When adding the initiator to the monomer premix and then thoroughly mixing with high speed agitation or stirring, or when homogenizing the premix, such as when an alcohol(s) is employed in the reaction mixture, it is necessary to keep the temperature below the minimum temperature of reactivity of the particular initiator or initiators being employed. This minimum temperature of reactivity of any one initiator is readily determinable by one skilled in the art and very often, is supplied by the initiator or catalyst manufacturer. After introduction of the monomer premix into the reactor, the temperature is adjusted to that at which the reaction is to take place.

The temperature of reaction of the emulsion polymerization process is important since the inherent viscosity (IV) of the resultant vinyl dispersion resin is a direct function of the temperature of reaction. That is, the higher the temperature the lower the IV. Accordingly, the end use of the vinyl dispersion resin to be produced will normally dictate the reaction temperature. For example, when producing vinyl dispersion resins to be used in coatings or in casting flexible films, a lower temperature will be employed in order to attain a higher IV which is desirable for many coating applications and film-forming operations. We have found that for the end uses to which the vinyl dispersion resins of this invention are particularly adapted, polymerization temperatures in the range of about 30° C. to about 55° C.

Another factor, which must be considered with respect to the temperature of the reaction, is that of polymer buildup in the reactor. In general, as the temperature of reaction increases, the polymer buildup in the reactor increases. However, the polymer buildup is not of the hard crusty type and can be removed by rinsing or hosing down with water and without opening the reactor when appropriate spray nozzles are installed in the reactor. On the other hand, even this buildup is controlled and reduced when the walls of the reactor are kept cool during the polymerization reaction, especially during the early stages of the reaction when most of the buildup, if any, forms. The regulation of the temperature of the reaction can be accomplished by normal means, such as employing a jacketed reactor with circulating cool water or other liquid in the jacket.

Upon completion of the polymerization reaction, the vinyl dispersion resin is isolated in powder form, that is, in the form of discrete spherical polymer particles. First, the aqueous solution of the electrolyte is thoroughly mixed with the vinyl polymer latex, upon completion of which the latex will have a consistency of whipped cream. Then the latex is filtered in order to recover the friable aggregates of vinyl polymer. Most any type filtering means may be used but due to the nature of the polymer latex, it is generally desirable to employ a pressure filter. Thereafter the filtered latex is dried at a temperature in the range of about 23° C. to about 100° C. under atmospheric pressure during the course of which the electrolyte comes off. The drying temperature can be lower or higher than the limits of said range of temperature depending upon whether or not the drying step takes place under a vacuum or under positive pressure. The time of the drying step will depend upon the particular polymer being dried. However, the drying should continue until the water content of the polymer is about 0.1% by weight or lower. The time, of course, will vary with the temperature being employed. The important thing is not to subject the polymer to prolonged heating at elevated temperatures since such heating may deleteriously affect the quality of the polymer, such as discoloration, etc. After drying, the friable aggregates of individual spheres of polymer particles that are found are crushed lightly or rubber to separate the individual spheres and the dried polymer or resin is recovered in powder form. The powdered vinyl resin is then ready to be made into plastisols.

Plastisols are made with the vinyl dispersion resins of the present invention by uniformly blending or intimately mixing, by conventional means using heat and agitation, with 100 parts of the vinyl dispersion resin in the form of discrete spherical polymer particles, from about 30 to about 100 parts by weight of one or more plasticizers. The useful plasticizers may be described as the alkyl and alkoxy alkyl esters of dicarboxylic acids or esters of a polyhydric alcohol and a monobasic acid. As examples of such plasticizers, there may be named dibutyl phthalate, di(2-ethyl hexyl) phthalate, dioctyl phthalate, dibutyl sebacate, dinonyl phthalate, di(2-ethyl hexyl) adipate, dilauryl phthalate, dimethyl tetrachlorophthalate, butylphthalyl butyl glycollate, glyceryl stearate, and the like. The preferred plasticizers are the liquid diesters of aliphatic alcohols having from 4 to 20 carbon atoms and dibasic carboxylic acids having from 5 to 14 carbon atoms.

The plastisols made from the vinyl dispersion resins should have the desired yield and preferably with little or no dilatency. Yield is simply defined as resistance to flow and is normally determined numerically through viscosity measurements employing well known standard techniques. Normally such values are arrived at by calculation from viscosity measurements using a Brookfield Model RVF Viscometer according to ASTM method D1824-61T. Yield is determined from viscosity measurement of the plastisols at varying r.p.m.'s (revolutions per minute) after initial preparation and at intervals of aging. The viscosity is measured in centipoises (cps.) at a temperature of 23° C. In the examples, that follow hereinafter, viscosity measurements were made at 2 rpm and 20 rpm and are expressed as $V_2$ and $V_{20}$ respectively.

To further illustrate the present invention, the following specific example is given, it being understood that this is merely intended in an illustrative and not a limitative sense. In the example, all parts and percents are by weight unless otherwise indicated.

EXAMPLE I

A polyvinyl chloride (PVC) emulsion polymerized latex was prepared using the following recipe:

| | |
|---|---|
| Vinyl Chloride | 100 parts |
| Water (demineralized) | 225 parts |
| Potassium persulfate | 0.02 part |
| Lauric Acid | 0.8 part |
| Ammonium hydroxide (28%) | 0.52 part |
| Sodium metabisulfite | 0.003 part |
| Sodium lauryl sulfate | 0.2 part |

The ingredients were added to and mixed in the polymerization reactor. First, the water was added and agitation begun with the temperature adjusted to 30° C. Then the potassium persulfate was added followed by the sodium metabisulfite and the sodium lauryl sulfate. The latter was employed in place of a seed PVC. The reactor was evacuated and broken with nitrogen. Thereafter, the vinyl chloride was added to the reactor. An emulsifier solution was prepared by adding 90.4 grams of lauric acid to 16 pounds of demineralized water, heating to 50° C., adding 210 grams of $NH_4OH$ and cooling to room temperature. The reaction medium was heated to 40° C. and the emulsifier lution was proportioned into the reactor during the course of the polymerization. The temperature was reached and then the temperature was reduced to 35° C. and held there until the reaction was complete. The pH of the reaction mixture was 9.9. Thereafter, the reactor was cooled, vented and the PVC latex removed.

An electrolyte solution was made by dissolving 5.0 parts of $(NH_4)_2CO_3$ in 400 ml $H_2O$. This solution was slowly added, with agitation, to 5 pounds of the PVC latex until 2.2 parts of $(NH_4)_2CO_3$ had been added. The same procedure was followed using $CaCO_3$ and adding the solution to 5 pounds of PVC latex until 0.2 part of $CaCO_3$ has been added. Thereafter the two latices were tray dried at 65° C. and the resultant dried cakes were broken up by lightly crushing.

Plastisols were made with each of the dried PVC's using the following recipe:

| | |
|---|---|
| PVC | 100 parts |
| Dioctyl phthalate | 40 parts |
| Dioctyl adipate | 30 parts |
| Epoxidized soybean oil | 3 parts |
| Barium—cadmium—zinc phosphite | 2 parts |

The Brookfield Viscosity was determined for each plastisol and the viscosity and other data are recorded in the following Table I:

TABLE I

| Electrolyte Addition | No. 1 | No. 2 |
|---|---|---|
| Type | $(NH_4)_2CO_3$ | $CaCO_3$ |
| Level | 2.2 parts | 0.2 part |
| Emulsifier-type | $NH_4$ laurate | $NH_4$ laurate |
| Latex viscosity | Whipped Cream | Whipped Cream |
| Dry cake break-up | Excellent | Excellent |
| Plastisol Properties | | |
| Type drying | Tray | Tray |
| Brookfield Viscosity | | |
| Initial $V_2$ | 6,000 cps. | 1,850 cps. |
| $V_{20}$ | 2,670 | 1,040 |
| 1 Day $V_2$ | 13,200 | 3,000 |
| $V_{20}$ | 5,670 | 1,700 |
| Heat Stability- @ 375° F. | | |
| Initial Color | 20 min. | 25 min. |
| Yellow | 40 | 35 |
| Dark | 60 | 60 |

In the above Table the term "Whipped Cream" is the ideal condition for the latex or slurry. It is noted that the important property of "Dry cake breakup" was excellent. This shows the advantages of adding an electrolyte to the latex which enables one to tray dry rather than spray dry the latex. This is a distinct advantage in producing vinyl dispersion resins.

Thus, it can be seen that the addition of an electrolyte to the vinyl polymer latex results in the ability to dry the same by simple drying methods. This eliminates the spray drying and the harsh grinding step attendant thereto, which adversely affects polymer quality. This contributes to a low cost vinyl dispersion resin process. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:
1. A process for producing polymers of vinyl and vinylidene halides and copolymers thereof with each other or either with up to about 80% by weight of one or more other monoethylenically unsaturated monomers copolymerizable therewith comprising, forming a monomer premix containing the monomer or monomers to be polymerized, the aqueous reaction medium, from about 0.05% to about 0.5% by weight of a free radical yielding catalyst based on the weight of 100 parts of monomer(s) being polymerized, from about 0.5% to about 4.0% by weight, based on the weight of the monomer or monomers being polymerized, of at least one emulsifier for the polymerization system selected from the group consisting of fatty acid salts containing from 8 to 20 carbon atoms, and sulfate and sulfonate type soaps from $C_{12}$ to $C_{20}$ alkyl or aryl hydrocarbons, mixing said premix at a temperature below the reactivity of the catalyst or catalysts employed, passing said premix to a reaction zone, emulsion polymerizing said premix in said zone at a temperature in the range of about 30° C. to about 70° C. to form a polymer latex containing individual spheres of polymer particles, maintaining the pH in the reaction zone in the range of about 3.0 to about 12.0 until the reaction is complete, removing the polymer latex from said reaction zone, mixing with said polymer latex from about 0.05% to about 5.0% by weight of a partially fugitive gas producing electrolyte, based on the weight of the polymer in the latex, filtering said latex to recover polymer and friable aggregates of polymer while removing the electrolyte therefrom, and lightly crushing said dried friable aggregates to form individual spheres of polymer particles.

2. A process as defined in claim 1 wherein the monomer in the premix is vinyl chloride.

3. A process as defined in claim 1 wherein the emulsifier is the ammonium salt of a high fatty acid containing from 8 to 20 carbon atoms.

4. A process as defined in claim 1 wherein the monomer premix contains at least one long straight chain saturated alcohol containing from 14 to 24 carbon atoms and wherein the ratio of alcohol to emulsifier is greater than 1.0.

5. A process as defined in claim 1 wherein the electrolyte is $(NH_4)_2CO_3$.

6. A process as defined in claim 1 wherein the electrolyte is $CaCO_3$.

7. A process as defined in claim 1 wherein the size of the dried individual spheres of polymer particles is in the range of about 0.1 micron to about 10.0 microns.

8. A process as defined in claim 3 wherein the fatty acid is lauric acid.

9. A process as defined in claim 1 wherein the drying is conducted at a temperature in the range of about 23° C. to about 100° C. at atmospheric pressure.

10. A process as defined in claim 7 wherein the monomer in the premix is vinyl chloride.

11. A process as defined in claim 10 wherein the electrolyte is $(NH_4)_2CO_3$.

12. A process as defined in claim 11 wherein the emulsifier is ammonium laurate.

13. A process as defined in claim 12 wherein the catalyst is potassium persulfate.

14. A process as defined in claim 13 wherein the pH in the reaction zone is maintained in the range of about 8.0 to about 10.5.

15. A process as defined in claim 1 wherein the monomers in the premix are vinyl chloride and vinyl acetate.

16. A process as defined in claim 1 wherein the mixing of the premix is done by homogenization.

* * * * *